A. F. CARTON.
FLUID GAGE.
APPLICATION FILED JULY 25, 1916.
1,225,108.
Patented May 8, 1917.
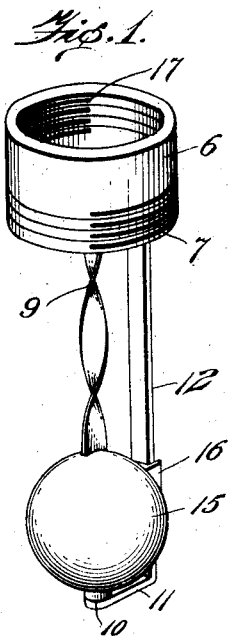
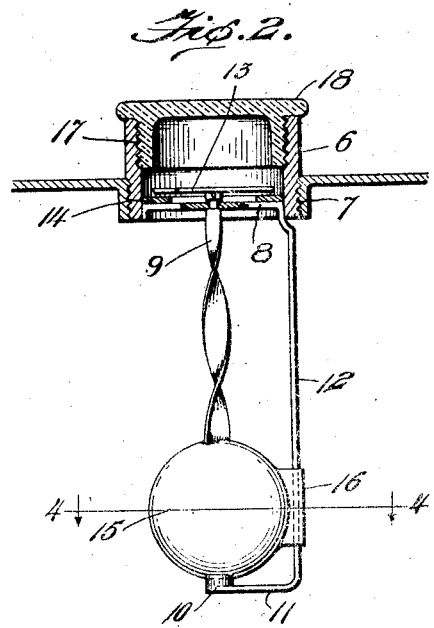
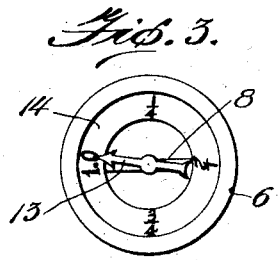
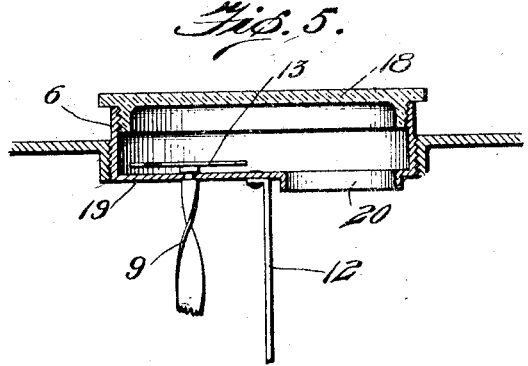
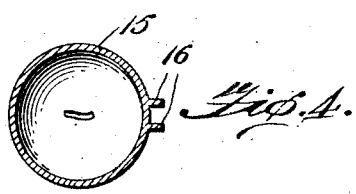
WITNESSES
INVENTOR
Albert F. Carton
BY
ATTORNEY

UNITED STATES PATENT OFFICE.

ALBERT F. CARTON, OF PIPESTONE, MINNESOTA.

FLUID-GAGE.

1,225,108.  Specification of Letters Patent.  Patented May 8, 1917.

Application filed July 25, 1916. Serial No. 111,310.

*To all whom it may concern:*

Be it known that I, ALBERT F. CARTON, a citizen of the United States, residing at Pipestone, in the county of Pipestone and State of Minnesota, have invented certain new and useful Improvements in Fluid-Gages, of which the following is a specification.

This invention relates to gages, and particularly to means for indicating the quantity of fluid contained within a tank or reservoir.

The invention is adapted particularly for use in conjunction with fuel tanks of lamps, motor vehicles and the like, and has for its primary object to provide a simple and inexpensive device for this purpose, which is capable of being readily attached or detached from the tank, which is positive and accurate in operation, and which will prove thoroughly efficient in practice.

A further object of the invention is to provide a gage of this character which is adapted for insertion in the filling opening of a tank, and which embodies means for permitting the tank to be refilled without resorting to the necessity of removing the gage from the tank.

A still further and particular object of the invention is to provide a gage of the character above briefly referred to, which may be readily applied to tanks of various constructions, which is inexpensive of manufacture, which is featured by the lack of intricate or complicated parts, which is automatic in operation, and which will prove thoroughly efficient in the attainment of the ends for which it is designed.

With these objects in view, together with others which will appear as the description proceeds, the invention resides in the novel formation, combination and arrangement of parts, all as will be described more fully hereinafter, illustrated in the accompanying drawings, and particularly pointed out in the claims.

The invention will be best understood by reference to the accompanying drawings, wherein:—

Figure 1 is a perspective view of a fluid gage constructed in accordance with my invention, the same being shown detached from a tank or reservoir;

Fig. 2 is a vertical sectional view taken through the gage and illustrating the same as applied to a tank;

Fig. 3 is a top plan view of the gage with the closure cap removed;

Fig. 4 is a transverse sectional view taken on line 4—4 of Fig. 2; and

Fig. 5 is a view similar to Fig. 2 and illustrating a slightly modified form of the invention.

The invention contemplates the arrangement of a fluid gage adapted for insertion within the inlet opening of a tank, and which may be readily detached therefrom when desired. In the preferred embodiment of the invention, a tubular member 6 is provided, the said member being of relatively short length and of sufficient diameter to be engaged within the inlet opening of a tank. The tubular member is provided adjacent its lower end with external threads 7, which are adapted to engage with the threads in the intake opening, whereby the said tubular member may be readily engaged within the tank opening, and protrudes slightly above the same as shown.

Extending diametrically across the tubular member 6 adjacent the lower extremity thereof, is a cross bar 8, the latter being provided intermediate its ends with an opening through which a spindle 9 extends. This spindle projects at one end below the tubular member, and is seated at its lowermost extremity in a suitable bearing 10, formed upon an outwardly extending arm 11 at the lowermost extremity of a guide bar or support 12. This support is secured at its uppermost end to the tubular member, and is straight for the major portion of its length. The uppermost extremity of the spindle 9 is equipped with an arrow constituting an indicating finger 13, the latter being adapted upon rotation of the spindle to move with the latter and to point to certain inscriptions or indications upon a dial in the form of a rim or bottom 14 arranged in any suitable manner within the tubular member adjacent the lower end thereof.

The means for rotating the spindle 9 to indicate the exact level of fluid within the tank comprises a float 9 in the form of a ball 15 arranged for sliding movement upon the said spindle. This ball is provided with an aperture through which the spindle extends, and the said spindle is flattened and twisted as shown throughout the major portion of its extent. The float 15 is provided with a pair of spaced arms 16 which embrace the sides of the guide bar 12, whereby rotary movement of the float is prevented. From this construction, it is apparent that the float is capable of traveling up and down the guide bar and spindle, being held against rotation by the guide arms 16, and will, upon raising or lowering, create rotary movement in the spindle 9. The twist in the spindle is so formed that the movement of the float from its lowermost to the limit of its uppermost movement creates a complete revolution of the spindle, and the indicator 13 carried upon the spindle will register with the various indicating inscriptions on the rim 14. The inscriptions are preferably arranged upon the rim or bottom in such manner as to indicate the correct quantity of fluid within the tank according to the position of the float, the latter, as is obvious, being at all times upon the liquid level. The upper extremity of the tubular member 6 is internally threaded as at 17, and a transparent cap 18 is threaded in said end to close the tank. This cap is preferably constructed of glass and the indications recorded by the finger 13 may be readily observed through the same.

After the indicating device has been properly screwed within the opening in the tank, the latter may be filled, the outwardly projecting portion of the tubular member 6 affording means whereby the filling of the tank may be accomplished, without the use of a funnel. The fluid passes through the tubular member and through the spaces upon the opposite sides of the cross bar 8. As the liquid rises, the float accordingly ascends, and the spindle 9 is rotated accordingly as the float rises. When the tank is filled, the spindle will have completed a revolution, and will indicate through the finger 13, the filled condition of the tank. The glass screw cap 18 may be adjusted within the tubular member to prevent dirt from gaining access to the tank and to prevent the contents of the latter evaporating or splashing from the same. The quantity of fluid within the tank may be readily determined by looking through the transparent screw cap 18.

In that form of the device illustrated in Fig. 5, the tubular member is of relatively large diameter, and is adjusted within the tank opening in the same manner as the above detailed form of the device. The tubular member, however, in the modified form of the device is closed at its lower end, the bottom being indicated at 19. The supporting rod 12 may depend from one side of the bottom 19, and the spindle 9 projects upwardly through said bottom and is equipped at its upper end with a pointer 13 as usual. The pointer 13 travels around a dial painted or printed upon the upper surface of the bottom 19. The bottom is equipped with an opening 20, remote from the dial through which the tank or reservoir may be filled. It will be understood, of course, that the tubular member in the modified form of the device is closed by a glass or other transparent cap as in the preferred form.

While the above is a description of the preferred embodiments of the invention, it is apparent that various changes in minor details of construction and arrangement of parts may be resorted to without departing from the spirit of the invention or exceeding the scope of the claims.

What is claimed is:—

1. In a device of the class described, a tubular member adapted for insertion in a tank, a guide bar depending from said tubular member, a cross bar in said tubular member, a spindle supported at its lower end for rotation upon said guide bar and extending at its upper end through said cross bar, the said spindle being spiral throughout the major portion of its length, a float mounted to travel upon said spindle and to engage said spirals to rotate the spindle, arms carried by said float and engaging said guide bar, a dial in said tubular member, the said dial having a filling opening therein, and an indicator fixed to said spindle, substantially as described.

2. In a device of the class described, a tubular member having external threads adjacent one end for engagement with a tank opening, a guide bar carried by said tubular member and depending therefrom, a spindle rotatably mounted upon said guide bar and extending at its upper end into said tubular member, a dial in said tubular member, the said dial having an open central portion, a finger on said spindle adapted to travel around said dial, the said spindle being spiral throughout the major portion of its extent, a float mounted for sliding movement upon said spindle and adapted to engage said spirals to rotate said spindle, and means for maintaining said float against rotation, substantially as described.

3. In a device of the class described, a tubular member having external threads at one end and internal threads at the opposite end, the said tubular member being adapted by its external threads to be screwed into a tank, an indicating means carried by said tubular member, means controlled by the liquid in the tank for operating said indicating means, and a transparent cap for engagement with said internal threads, substantially as described.

4. In a device of the class described, a tubular member having one end adapted for insertion in a tank, a bottom in said tubular member having a filling opening and being provided with a dial, an indicating finger adapted to travel around said dial, means controlled by the liquid in the tank for moving said finger, and a transparent cap closing the protruding end of said tubular member, substantially as described.

5. In a device of the class described, a tubular member adapted for insertion in a tank, a bottom for said member, the said bottom being provided with a dial, a spindle projecting through said bottom concentric with said dial, a finger on said spindle for traveling upon said dial, means controlled by the liquid in the tank for rotating said spindle, the said bottom being provided with a filling opening, and a cap for closing said tubular member, substantially as described.

In testimony whereof I affix my signature in presence of two witnesses.

ALBERT F. CARTON.

Witnesses:
   THEO. A. HOLIEN,
   T. G. FOSSUM.